(12) United States Patent
Narahara et al.

(10) Patent No.: US 8,646,009 B2
(45) Date of Patent: Feb. 4, 2014

(54) METHOD FOR PROVIDING CONTENT

(75) Inventors: Tatsuya Narahara, Kanagawa (JP); Sho Murakoshi, Tokyo (JP); Shunji Yoshimura, Tokyo (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 12/329,209

(22) Filed: Dec. 5, 2008

(65) Prior Publication Data

US 2009/0178085 A1    Jul. 9, 2009

(30) Foreign Application Priority Data

Jan. 8, 2008    (JP) ................................. 2008-000978

(51) Int. Cl.
*H04N 7/16* (2011.01)
*H04N 7/18* (2006.01)
*H04N 7/173* (2011.01)

(52) U.S. Cl.
USPC ............... 725/62; 725/68; 725/100; 725/110; 725/131

(58) Field of Classification Search
USPC ........... 725/74–85, 134, 142, 62, 68, 88, 100, 725/102, 110, 131, 139, 151; 709/227, 228, 709/231, 232; 386/299, 291, 314
See application file for complete search history.

(56) References Cited

U.S. PATENT DOCUMENTS

| 6,611,654 B1 * | 8/2003 | Shteyn ........................... 386/291 |
| 7,499,530 B2 * | 3/2009 | Carroll et al. .............. 379/88.25 |
| 8,214,422 B1 * | 7/2012 | Woodward et al. ........... 709/201 |
| 2005/0262267 A1 * | 11/2005 | Jennings ........................ 709/238 |
| 2006/0117379 A1 * | 6/2006 | Bennett et al. ..................... 726/3 |
| 2007/0162941 A1 * | 7/2007 | Bennett et al. .................. 725/81 |
| 2008/0051071 A1 * | 2/2008 | Vishwanathan et al. ... 455/414.1 |
| 2009/0074380 A1 * | 3/2009 | Boston et al. .................... 386/83 |

FOREIGN PATENT DOCUMENTS

| JP | 2001-313919 | 11/2001 |
| JP | 2002-33802 | 1/2002 |
| JP | 2003-85084 | 3/2003 |
| JP | 2006-92461 | 4/2006 |
| JP | 2007-156804 | 6/2007 |
| WO | WO 2006/054662 A1 | 5/2006 |
| WO | WO 2007/145225 A1 | 12/2007 |

* cited by examiner

*Primary Examiner* — Pankaj Kumar
*Assistant Examiner* — Alazar Tilahun
(74) *Attorney, Agent, or Firm* — Oblon, Spivak, McClelland, Maier & Neustadt, L.L.P.

(57) ABSTRACT

In response to a request from a playback apparatus over a network to play back content, a first recording/playback apparatus transmits data indicating content satisfying the request to the playback apparatus over the network. When selecting desired content from the transmitted data, the playback apparatus requests the first recording/playback apparatus to transmit data of the selected content to the playback apparatus over the network. When the data of the desired content is transmitted to the playback apparatus from the first recording/playback apparatus over the network in response to the request, the content being transmitted is played back via streaming. When the playback apparatus transmits data indicating the played back content and an address of a second recording/playback apparatus to the first recording/playback apparatus over the network, the first recording/playback apparatus transmits data of the played back content to the second recording/playback apparatus over the network in accordance with the address.

9 Claims, 7 Drawing Sheets

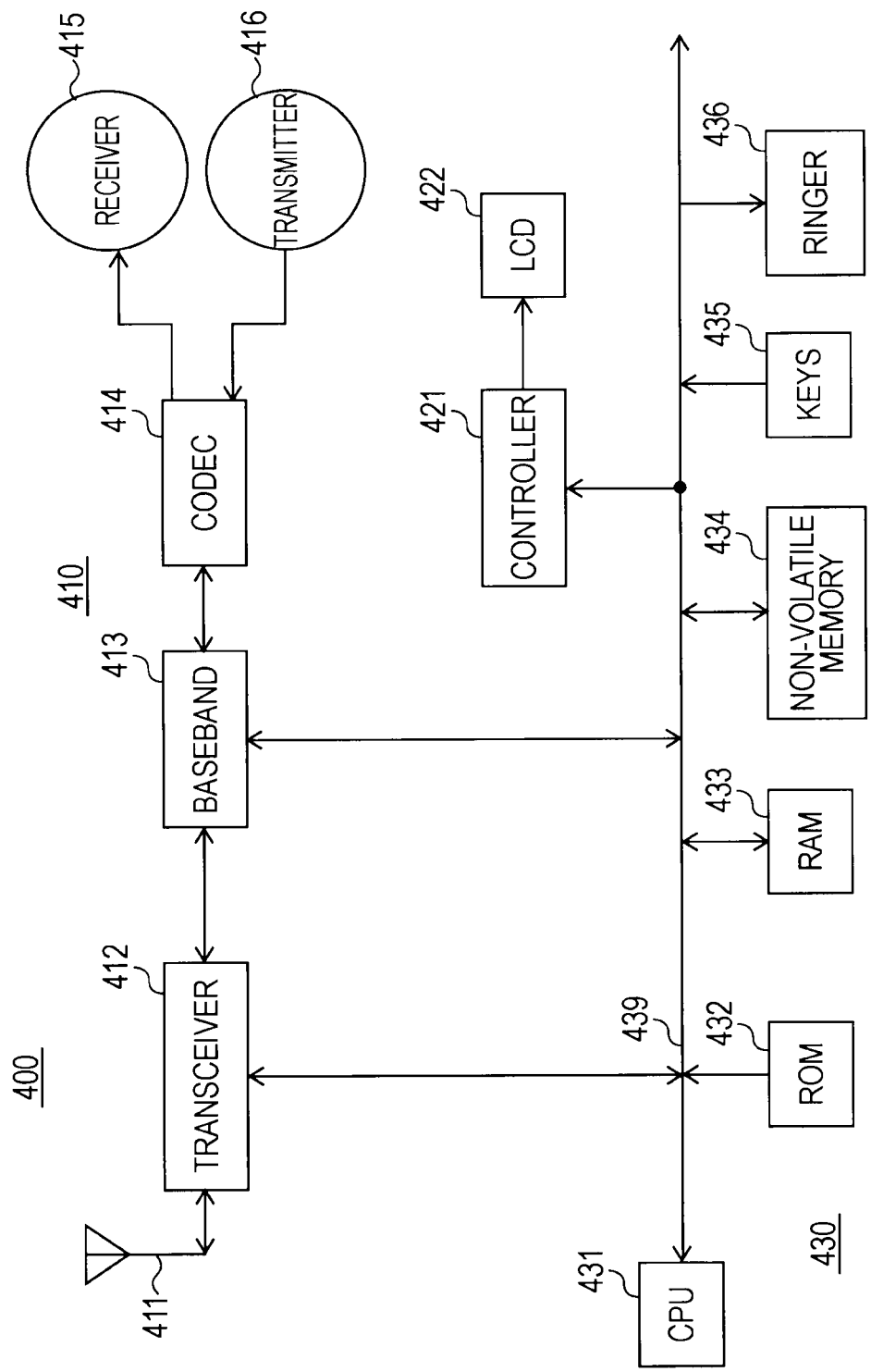

FIG. 6A

```
ABC COOKING SHOW
"PASTA WITH EGGPLANT AND GROUND MEAT"
CH **
13:45 (00:15)  JUN 15 (THU)
```

FIG. 6B

```
XYZ GOSSIP SHOW    JANE'S COOKING CORNER
"BITTER GOURD CURRY"
CH **
12:18 (00:20)  JUN 16 (FRI)
```

| ID CODE | XXXXX |
|---|---|
| CATEGORY NAME | COOKING>HOMEMADE |
| PROGRAM NAME | ABC COOKING SHOW |
| SUBTITLE | PASTA WITH EGGPLANT AND GROUND MEAT |
| BROADCAST DATE AND TIME | 13:45 JUN 15 (THU) |
| BROADCAST TIME PERIOD | 00:15 |
| CAST | JANE DOE, JUDY DOE, JOHN DOE |
| KEYWORDS | EGGPLANT, GROUND MEAT, PASTA |
| LINK POINTER | XXXXX |
| ••••• | ••••• |

SCNT

ID CODE
FORWARDING DESTINATION ADDRESS
COPY FLAG

FRLT

METHOD FOR PROVIDING CONTENT

CROSS REFERENCES TO RELATED APPLICATIONS

The present invention contains subject matter related to Japanese Patent Application JP 2008-000978 filed in the Japanese Patent Office on Jan. 8, 2008, the entire contents of which are incorporated herein by reference.

BACKGROUND OF THE INVENTION

1. Field of the Invention

The present invention relates to a method for providing content.

2. Description of the Related Art

Hard disk recorders as video recorders for recording content such as television programs have become more and more popular. The hard disk recorders use large-capacity hard disk drives (HDDs) as recording media, and are capable of quickly selecting and playing back a desired content item from among a plurality of recorded content items or playing back only a portion of a desired content item.

Playback systems which allow users to view content, which is recorded on hard disk recorders in their home, from various locations even outside their home using portable video players or mobile phones have been developed. For example, a program broadcast at midnight is timer-recorded on a hard disk recorder at home and is copied to a portable video player so that a user can view the program in the workplace during his or her lunch break.

Japanese Unexamined Patent Application Publication No. 2007-156804 is an example of related art.

SUMMARY OF THE INVENTION

Allowing a user to carry content from his or her home to view it outside the home, as described above, may provide an opportunity for the user to show the content to a second user using a portable video player. Portable video players have generally a small screen, and the second user may wish to obtain the content in order to view it on a larger display screen in his or her home.

This may involve an operation which is time-consuming for the first user, that is, copying the content onto a certain medium after he or she comes home and mailing the medium.

It is desirable to avoid such a time-consuming operation.

An embodiment of the present invention provides a method for providing content, including the steps of, in response to a request from a playback apparatus over a network to play back content, transmitting data indicating content satisfying the request from a first recording and playback apparatus to the playback apparatus over the network; when the playback apparatus selects desired content from the transmitted data, requesting the first recording and playback apparatus to transmit data of the selected content to the playback apparatus over the network; when the data of the desired content is transmitted to the playback apparatus from the first recording and playback apparatus over the network in response to the request, playing back, via streaming, the content being transmitted; and when the playback apparatus transmits data indicating the played back content and an address of a second recording and playback apparatus to the first recording and playback apparatus over the network, transmitting data of the played back content from the first recording and playback apparatus to the second recording and playback apparatus over the network in accordance with the address.

According to an embodiment of the present invention, content recorded on a recorder can be selected using a portable player and can be played back via streaming. Therefore, a user can view desired content at any location at any time.

The recorder can also serve as a video server which allows the content played back via streaming using the portable player to be copied to another recorder to provide easy viewing of the content at any time or provide display of the content on a display of another user via streaming playback.

Moreover, a user only selects a desired content item from among a plurality of content items recorded on a recorder, which is simple as with the playback of the desired content item at home.

BRIEF DESCRIPTION OF THE DRAWINGS

FIG. 4 is a system diagram of a playback system according to an embodiment of the present invention;

FIGS. 6A and 6B are diagrams showing an embodiment of the present invention;

DESCRIPTION OF THE PREFERRED EMBODIMENTS

For more easily understanding, an overview of an embodiment of the present invention will be described separately with respect to the following two cases:

(1) Content recorded on a recorder is played back via streaming using a portable video player.

(2) Content recorded by a user is provided to another user.

An overview of streaming playback will now be described.

A description will be given of a case where a television program recorded by a user A in his or her home is played back via streaming using a portable video player outside the home.

Figure 1:
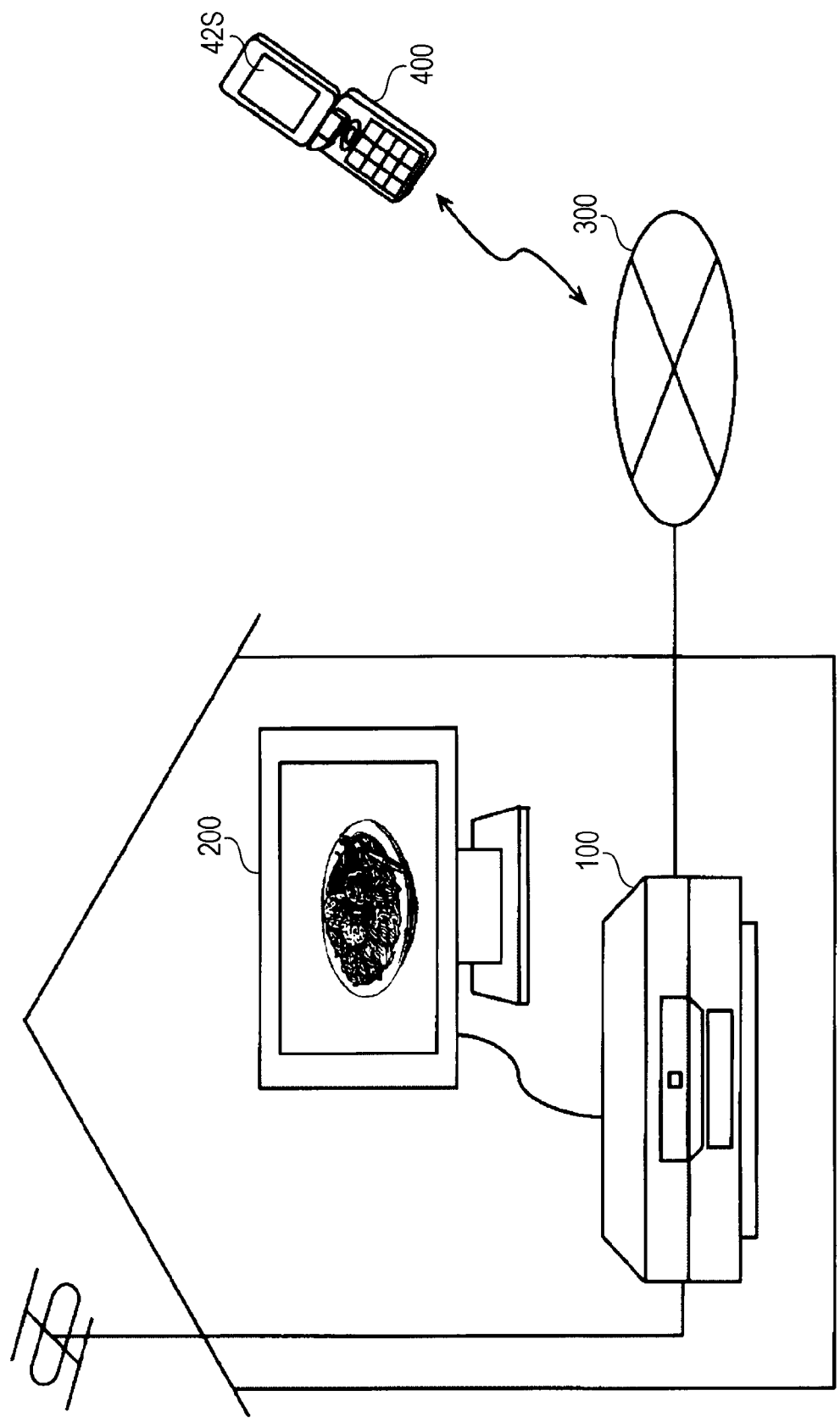
FIG. 1 is a system diagram showing an embodiment of the present invention.

FIG. 1 is a diagram showing an overview of an exemplary system according to an embodiment of the present invention. In the system, a hard disk recorder 100 serving as an apparatus for recording or playing back television programs is located in a home, and a display 200 serving as a monitor is connected to the hard disk recorder 100. A wide area network 300 such as a telephone network or the Internet and a mobile phone 400, which is an example of a portable video player, are further provided.

The hard disk recorder 100, a structure of which will be described in detail below, has functions for receiving content via services such as terrestrial digital television broadcasting, Broadcasting Satellite (BS) broadcasting, and Communication Satellite (CS) broadcasting and recording and playing back the content, namely, programs, as well as outputting signals of a program being recorded or played back to the display 200. The hard disk recorder 100 is configured to be connected to the wide area network 300 to supply a playback signal of a program recorded on the hard disk recorder 100 to the mobile phone 400 over the wide area network 300 so that the program can be played back via streaming using the mobile phone 400.

Note that in the hard disk recorder 100 according to the embodiment of the present invention, a "scene" of a program is a unit of streaming playback. The term "scene" as used herein refers to an entity (or section) having a complete meaning alone, such as an entire program or a certain part in a program. FIG. 6A shows a scene which represents one entire program, e.g., a cooking program, and FIG. 6B shows a scene which represents a cooking corner in a gossip show.

Figures 7, 8:
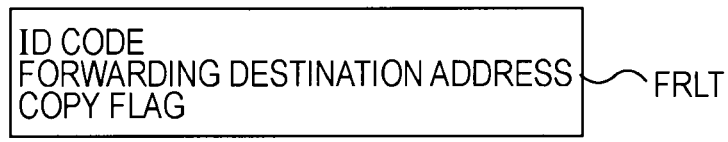
FIG. 7 is a diagram showing an embodiment of the present invention.
FIG. 8 is a diagram showing an embodiment of the present invention.

In order to play back a scene recorded on the hard disk recorder 100 via streaming using the mobile phone 400, for example, a scene table SCNT as shown in FIG. 7 is created in a portion of an internal hard disk drive (not shown) of the hard disk recorder 100. The scene table SCNT is a list of pieces of information relating to a program being broadcast, and is created for every scene. The scene tables SCNT may be created from electronic program guide (EPG) data, electronic content guide (ECG) data, relevant broadcast data attached to a program being broadcast, and data provided from various data services. The details of the scene tables SCNT will be described below.

ECG is a method in which a certain program is associated with metadata of the program in accordance with predetermined conditions. Examples of the metadata include, but not limited to, a corresponding program's identification code, name (program name), broadcast date, broadcast start time, broadcast time period (time length), genre, cast, other various relevant information, and search keywords.

The scene table SCNT includes an identification code of a scene, a category name of the scene, a program title, a subtitle, a broadcast date and time, a broadcast time period, the cast, search keywords useful to search for the scene (for example, for cooking, ingredients), and a link pointer indicating a recording position at which the scene is recorded on the hard disk drive (recording start address). The scenes shown in FIGS. 6A, 6B, and 7 are cooking scenes.

In a normal recording process, which is similar to that of general video recorders, when recording is performed for the hard disk recorder 100 or, if scheduled recording based on a timer or EPG is set in advance, at the scheduled recording time, the hard disk recorder 100 records a program (or scene) in a currently selected channel onto the hard disk drive.

When a user performs a predetermined operation on the hard disk recorder 100 and the display 200, the program currently being recorded is displayed on the display 200. In accordance with the recording, a scene table SCNT is created.

In a normal playback process, which is also similar to that of general video recorders, when a playback operation is performed on the hard disk recorder 100, a program recorded on the hard disk drive of the hard disk recorder 100 is selected and played back so that the played back program is displayed on the display 200.

The viewing of a program (streaming playback) using the mobile phone 400 will now be described.

In the following description, by way of example, a user selects a "pasta with eggplant and ground meat" scene shown in FIG. 6A and views it via streaming playback using the mobile phone 400.

In this case, the user accesses the hard disk recorder 100 from the mobile phone 400 over the wide area network 300 to authenticate the mobile phone 400. If the mobile phone 400 is authenticated by the hard disk recorder 100, the mobile phone 400 notifies the hard disk recorder 100 of a recorded program being played back.

Figure 5A:
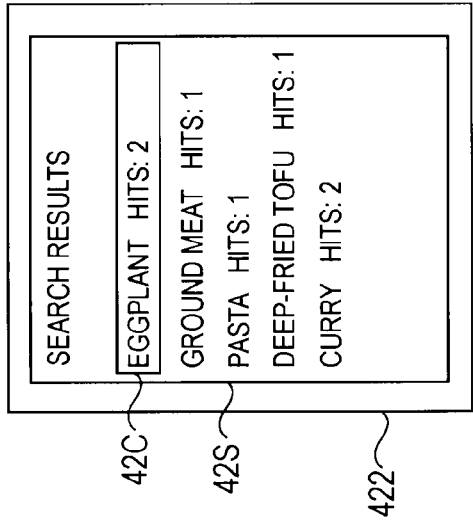
FIGS. 5A to 5F are diagrams showing an example of display according to an embodiment of the present invention.

Then, data indicating category names of scene tables SCNT created in the hard disk recorder 100 is transmitted from the hard disk recorder 100 to the mobile phone 400 over the wide area network 300, and a list of category names included in the scene tables SCNT is displayed on a screen 42S of the mobile phone 400 as shown in, for example, FIG. 5A. A cursor 42C is positioned on the first row of the list. If a plurality of scenes have an identical category name, one of them is presented as a representative scene. For example, if two scenes meeting the category name "cooking>homemade" exist, one of them is selected and displayed.

Figure 5B:
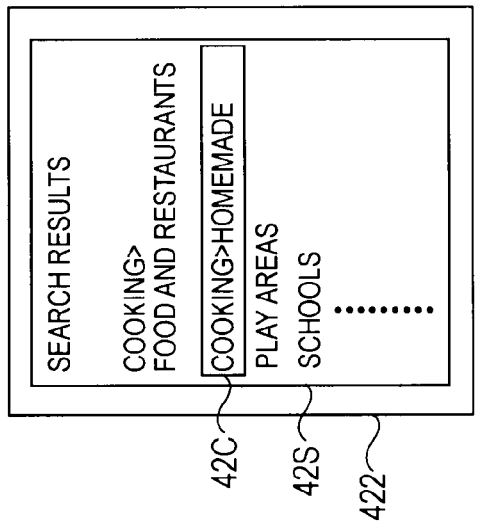

Then, as shown in FIG. 5B, the cursor 42C is moved to, for example, the category name "cooking>homemade" by operating a cursor key (not shown) of the mobile phone 400, and a set key (not shown) is operated. Then, the mobile phone 400 notifies the hard disk recorder 100 of the selection of the category name "cooking>homemade" over the wide area network 300.

Figure 5C:
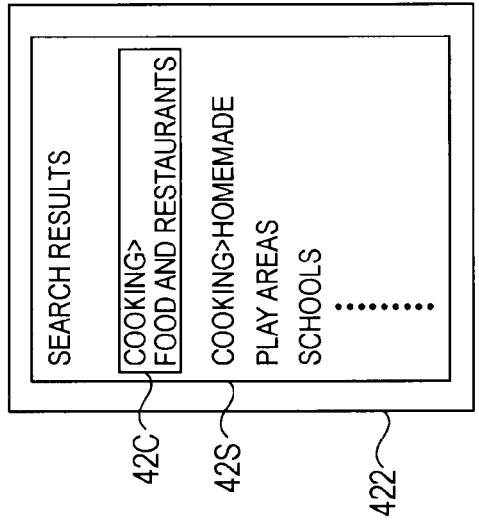

Then, in the hard disk recorder 100, all scene tables SCNT (FIG. 7) including the specified category name "cooking>homemade" are selected from among the scene tables SCNT registered in the hard disk drive, and keywords registered in the selected scene tables SCNT are transmitted from the hard disk recorder 100 to the mobile phone 400 over the wide area network 300. As a result, for example, as shown in FIG. 5C, a list of ingredients registered in the scene tables SCNT selected by the immediately preceding operation is displayed on the screen 42S of the mobile phone 400, and the cursor 42C is positioned on the first row of the list.

In this example, the user wishes to cook with eggplant, and the cursor 42C is positioned on the item or row "eggplant". The user operates the set key in the state shown in FIG. 5C. Then, the mobile phone 400 notifies the hard disk recorder 100 of the selection of the item "eggplant" over the wide area network 300.

Figure 5D:
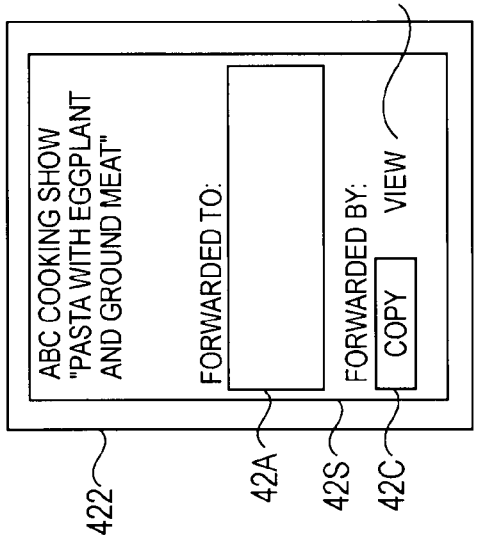

Then, in the hard disk recorder 100, data of program names and subtitles of scenes having keywords including "eggplant" is retrieved from the scene tables SCNT (FIG. 7) having the category name "cooking>homemade". The retrieved data is transmitted from the hard disk recorder 100 to the mobile phone 400 over the wide area network 300. On the screen 42S of the mobile phone 400, therefore, for example, as shown in FIG. 5D, a list of program names and subtitles of the corresponding scenes from among the scenes registered in the scene tables SCNT is displayed, and the cursor 42C is positioned on the first program name and name of dish.

In this example, the user wishes to cook "pasta with eggplant and ground meat", and the cursor 42C is positioned at the display position of the item "pasta with eggplant and ground meat". The user operates the set key in the state shown in FIG. 5D. Then, the mobile phone 400 notifies the hard disk recorder 100 of the selection of the item "pasta with eggplant and ground meat" over the wide area network 300.

Figure 5E:
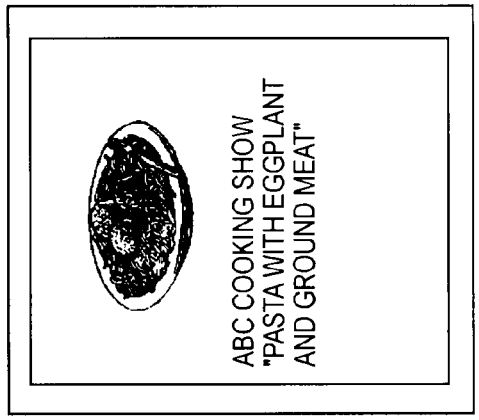

As a result, in the hard disk recorder 100, the "pasta with eggplant and ground meat" scene is selected and played back from an address specified by the link pointer in the scene table SCNT, and a playback signal is transmitted from the hard disk recorder 100 to the mobile phone 400 over the wide area network 300. On the screen 42S of the mobile phone 400, therefore, for example, as shown in FIG. 5E, the program showing "pasta with eggplant and ground meat" is played back via streaming and displayed.

According to the system described above, therefore, a scene (an entire program or a desired portion thereof)

recorded on the hard disk recorder 100 can be hierarchically selected using the mobile phone 400, and can be played back via streaming.

An example structure and operation of the hard disk recorder 100 will now be described.

Figure 3:
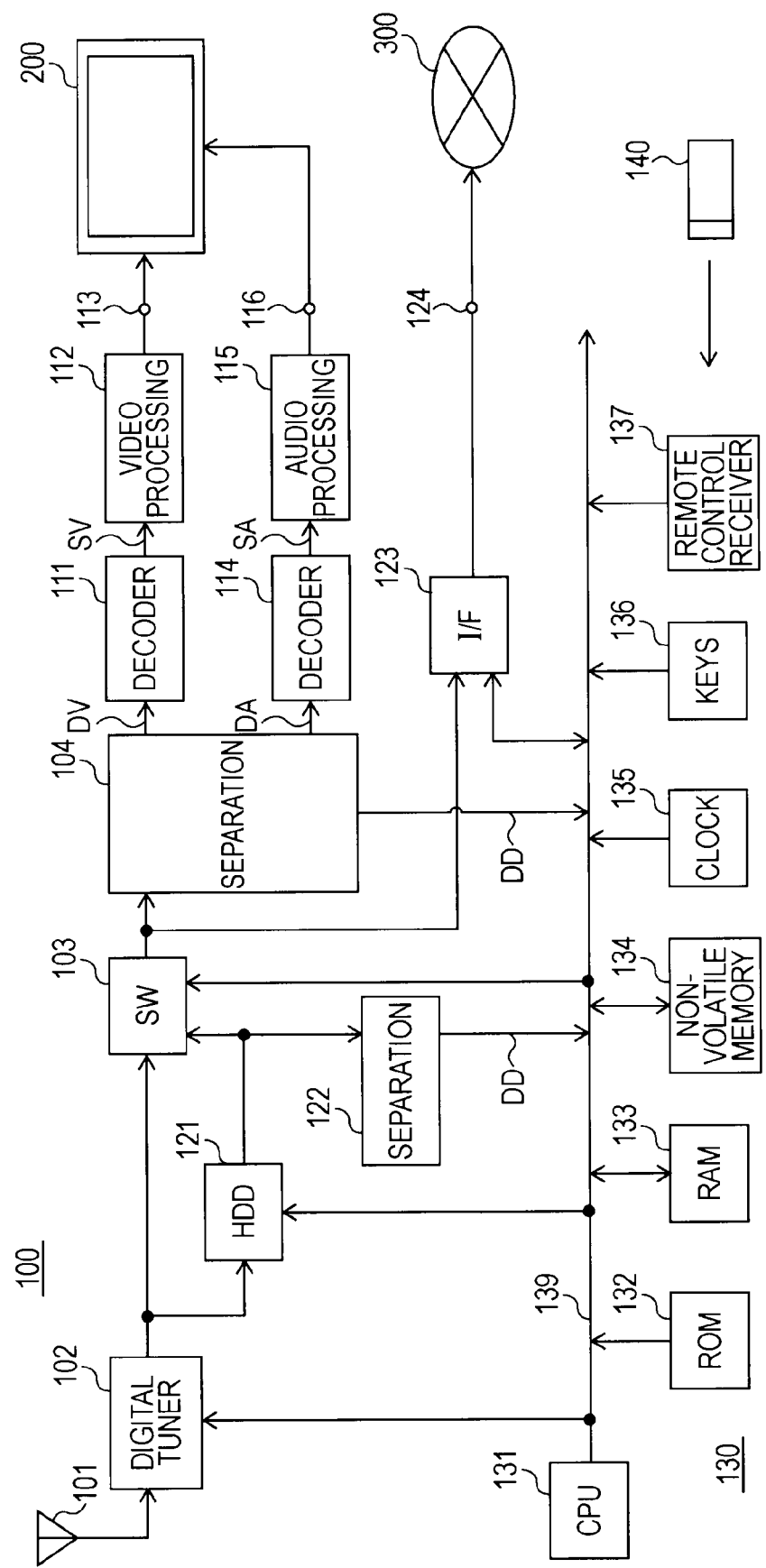
FIG. 3 is a system diagram of a recording system according to an embodiment of the present invention.

FIG. 3 shows an example of the hard disk recorder 100. In this example, the hard disk recorder 100 is configured to receive terrestrial digital broadcasts, BS broadcasts, and CS broadcasts and to record and play back them. That is, a digital broadcast is received by an antenna 101, and a received signal is supplied to a digital tuner 102 to extract digital data in a desired channel. The digital data is supplied to a switching circuit 103.

The hard disk recorder 100 is further provided with a large-capacity recording medium, for example, a hard disk drive 121, for recording programs (scenes). An output signal of the digital tuner 102 is supplied to the hard disk drive 121 as a recording signal. An output signal (recording monitor signal or playback signal) of the hard disk drive 121 is supplied to the switching circuit 103 and a separation circuit 122 to extract various digital data DD attached to a program. The digital data DD is supplied to a microcomputer 130 described below. The operation of the hard disk drive 121 is controlled by the microcomputer 130.

The switching circuit 103 is controlled by the microcomputer 130, and the output signal of the digital tuner 102 or the hard disk drive 121 is selectively extracted from the switching circuit 103 and is supplied to a separation circuit 104 to separate it into a digital video signal DV, a digital audio signal DA, and digital data DD, which are then output.

The digital video signal DV extracted from the separation circuit 104 is supplied to a decoder circuit 111 and is expanded into a digital video signal of the original size. The resulting signal is further digital-to-analog (D/A) converted into the original analog video signal SV. The analog video signal SV is subjected to various corrections or the like by a video processing circuit 112 and is fed to an output terminal 113. The analog video signal SV fed to the output terminal 113 is supplied to the display 200 to display an image.

The digital audio signal DA extracted from the separation circuit 104 is supplied to a decoder circuit 114 and is expanded into a digital audio signal of the original size. The resulting signal is further D/A converted into the original analog audio signal SA. The analog audio signal SA is subjected to various corrections or the like by an audio processing circuit 115 and is then fed to an output terminal 116. The analog audio signal SA fed to the output terminal 116 is supplied to built-in speakers (not shown) of the display 200 to output sound. The digital data DD extracted from the separation circuit 104 is supplied to the microcomputer 130.

The output signal of the switching circuit 103 is also supplied to an interface circuit 123 and is converted into a communication or delivery signal format, which is then extracted. The resulting signal is fed to an output terminal 124 and is then delivered to the mobile phone 400 over the wide area network 300, as described above. Further, data delivered from the mobile phone 400 over the wide area network 300 is input to the microcomputer 130 through the output terminal 124 and the interface circuit 123.

The microcomputer 130 described above is provided as a system control circuit. The microcomputer 130 includes a central processing unit (CPU) 131, a read only memory (ROM) 132, a random access memory (RAM) 133, and a non-volatile memory 134. The ROM 132, the RAM 133, and the non-volatile memory 134 are connected to the CPU 131 through a system bus 139. The CPU 131 is configured to execute various programs, and the ROM 132 contains the program executed by the CPU 131 and basic data. The RAM 133 serves as a work area when the CPU 131 executes a program, and the non-volatile memory 134 stores various data even during a power-off state.

The microcomputer 130 further includes a clock circuit 135, various operation keys 136, and a remote control receiving circuit 137. The clock circuit 135, the operation keys 136, and the remote control receiving circuit 137 are also connected to the system bus 139. The clock circuit 135 serves to give the current time of day. The operation keys 136 are configured to directly perform a basic operation on the hard disk recorder 100. The receiving circuit 137 is configured to be paired with a remote control transmitter 140. The remote control transmitter 140 and the receiving circuit 137 may implement, for example, an infrared remote control unit.

The microcomputer 130 further supplies control signals to the digital tuner 102, the hard disk drive 121, and the switching circuit 103 to control them.

With this structure, the operation keys 136 or the remote control transmitter 140 is operated to control the digital tuner 102, the hard disk drive 121, and the switching circuit 103 through the microcomputer 130. When the digital tuner 102 is controlled, a channel to be received is changed and a desired channel is received.

When the recording or playback of the hard disk drive 121 is controlled, a program (scene) currently being received is recorded or played back. Along with this, the switching operation of the switching circuit 103 is performed to select the signal of the program currently being received by the digital tuner 102 or the signal of the program currently being recorded or played back by the hard disk drive 121, and the selected signal is supplied to the separation circuit 104.

Therefore, the program can be received, recorded in the manner described above (normal recording operation), and played back in the manner described above (normal playback operation). A specific operation and method for performing streaming playback will be described below.

An example structure and operation of the mobile phone 400 will now be described.

FIG. 4 shows an example of the mobile phone 400. In this example, the mobile phone 400 may have an original function of a mobile phone and, as described above, a function of a portable video player. That is, the mobile phone 400 is configured to play back a program recorded on the hard disk recorder 100 via streaming over the wide area network 300.

In FIG. 4, the mobile phone 400 includes a talking circuit 410. During reception of a call using the mobile phone function, a transceiver antenna 411 receives radio wave from the wide area network 300, and the received signal is fed to a transceiver circuit 412 to extract a baseband digital signal. The digital signal is supplied to a baseband processing circuit 413.

The baseband processing circuit 413 performs call-reception baseband processing on the digital signal supplied thereto to extract a digital audio signal. The extracted signal is supplied to a coder-decoder (codec) circuit 414 to decode it into the original analog audio signal. The resulting audio signal is supplied to a receiver 415.

During transmission of a call, an audio signal from a transmitter 416 is supplied to the codec circuit 414 to encode it into a digital audio signal. The resulting signal is supplied to the baseband processing circuit 413 to perform call-transmission baseband processing and then supply the result to the transceiver circuit 412 to produce a transmission signal. The transmission signal is transmitted to the wide area network 300 through the transceiver antenna 411. Therefore, the user can talk with the other party using the talking circuit 410.

At the time of call-out, by operating operation keys 435, the transmission or reception of the transceiver circuit 412 is permitted, and data of a telephone number corresponding to the operation of the operation keys 435 is supplied to the transceiver circuit 412 from a microcomputer 430 described below through the baseband processing circuit 413. The data is then transmitted from the transceiver antenna 411. Therefore, the user can call the other party.

At the time of call-in, a signal indicating an incoming call is extracted from the baseband processing circuit 413. Based on this signal, a ringer 436 is driven by the microcomputer 430 and is notified of the incoming call. At this time, data such as a telephone number of a party that has delivered the incoming call is supplied to a display control circuit 421 to produce a display signal. This display signal is supplied to a display, for example, a liquid crystal display (LCD) 422, and the telephone number of the party and any other suitable information are displayed.

The microcomputer 430 described above is further provided as a system control circuit. The microcomputer 430 includes a CPU 431, a ROM 432, a RAM 433, and a non-volatile memory 434. The ROM 432, the RAM 433, and the non-volatile memory 434 are connected to the CPU 431 through a system bus 439. The CPU 431 is configured to execute various programs, and the ROM 432 contains the programs executed by the CPU 431 and basic data. The RAM 433 serves as a work area when the CPU 431 executes a program, and the non-volatile memory 434 stores various data even during a power-off state.

The microcomputer 430 further supplies control signals to the transceiver circuit 412 and the baseband processing circuit 413 to control them, and receives predetermined data from the circuits 412 and 413. This allows call-out, call-in, and talking in the manner described above. A specific operation and method for performing streaming playback will be described below.

FIG. 7 shows an example of a scene tables SCNT. As described above, the scene table SCNT is created in association with the recording of programs so that a scene recorded on the hard disk recorder 100 can be played back via streaming using the mobile phone 400.

The scene table SCNT includes an identification code, a category name of a scene, a program name, a subtitle, a broadcast date and time, a broadcast time period (length), the cast, a search keyword, and a pointer indicating a recording position at which the scene is recorded on a hard disk drive.

The identification code is unique data for identifying the scene table SCNT. The category name is, for example, as shown in FIG. 5A, an item name in a top category from which a desired scene is to be selected. In the scene table SCNT shown in FIG. 7, a cooking scene is illustrated by way of example. The program name is the title of the recorded program, and the subtitle is a theme of the program, which is created at a broadcast station. The scene table SCNT shown in FIG. 7 relates to a "pasta with eggplant and ground meat" dish.

The broadcast date and time and the broadcast time period (length) represent the time and time length at and for which the program was broadcast, respectively. The cast represents, for example, the main and guest cast of the program. The keyword represents search data useful for searching for the corresponding scene. For example, as shown in FIG. 7, for cooking, data of the ingredients or any other suitable data for the cooking is presented. The link pointer is a pointer indicating a recording position (recording start address) at which the scene corresponding to the scene table SCNT is recorded on the hard disk drive 121.

The viewing of a program (streaming playback) using the mobile phone 400 will now be described.

In the following description, by way of example, a user selects the "pasta with eggplant and ground meat" scene shown in FIG. 6A and views it via streaming playback using the mobile phone 400.

When a scene recorded on the hard disk recorder 100 is to be played back via streaming using the mobile phone 400, as described above with respect to the structure and operation of the mobile phone 400, the mobile phone 400 sends a call and accesses the hard disk recorder 100. Thereafter, the mobile phone 400 is authenticated by operating the operation keys 435. When the mobile phone 400 is authenticated by the hard disk recorder 100, the operation keys 435 are operated to allow the mobile phone 400 to notify the hard disk recorder 100 of a recorded program being played back.

Then, in the hard disk recorder 100, data indicating category names of scene tables SCNT created in the hard disk drive 121 is collected from the individual scene tables SCNT, and is transmitted from the hard disk recorder 100 to the mobile phone 400 over the wide area network 300. As described above, if a plurality of scenes have an identical category name, one of them is selected as a representative scene to prevent data of the identical category name from being redundantly transmitted.

Therefore, for example, as shown in FIG. 5A, a list of category names is displayed on the screen 42S of the mobile phone 400, and the cursor 42C is positioned on the first row of the list.

Then, as shown in FIG. 5B, the cursor 42C is moved to, for example, the category name "cooking>homemade" by operating a cursor key among the operation keys 435 of the mobile phone 400, and the set key is operated. Then, the mobile phone 400 notifies the hard disk recorder 100 of the selection of the category name "cooking>homemade" over the wide area network 300.

Then, in the hard disk recorder 100, all scene tables SCNT including the specified category name "cooking>homemade" are selected from among scene tables SCNT registered in the hard disk drive 121, and identification codes corresponding to the category name, which are associated with all the plurality of scenes even if the same category name has been assigned, are saved in, for example, the RAM 133.

In the hard disk recorder 100, furthermore, keywords registered in the scene tables SCNT including the specified category name "cooking>homemade", in this example, data indicating ingredients, are transmitted from the hard disk recorder 100 to the mobile phone 400 over the wide area network 300. As a result, for example, as shown in FIG. 5C, from the scene tables SCNT selected by the immediately preceding operation, a list of ingredients registered in the scene tables and a list of dishes using the ingredients are displayed on the screen 42S of the mobile phone 400, and the cursor 42C is positioned on the first row of the lists.

In this example, the user wishes to cook with eggplant, and the cursor 42C is positioned on the item or row "eggplant". The user operates the set key among the operation keys 435 in the state shown in FIG. 5C. Then, the mobile phone 400 notifies the hard disk recorder 100 of the selection of the item "eggplant" over the wide area network 300.

Then, in the hard disk recorder 100, data of program names and subtitles of scenes in scene tables SCNT having scenes whose identification codes are saved in the RAM 133, wherein the scenes are associated with "eggplant" as an ingredient, is retrieved and is transmitted from the hard disk recorder 100 to the mobile phone 400 over the wide area network 300. On the screen 42S of the mobile phone 400, therefore, for example, as shown in FIG. 5D, a list of program names and subtitles of the corresponding scenes from among the scenes registered in the scene tables SCNT is displayed, and the cursor 42C is positioned on first program name and name of dish.

In this case, the user wishes to cook "pasta with eggplant and ground meat", and the cursor 42C is positioned at the display position of the item "pasta with eggplant and ground meat". The user operates the set key among the operation keys 435 in the state shown in FIG. 5D. Then, the mobile phone 400 notifies the hard disk recorder 100 of the selection of the item "pasta with eggplant and ground meat" over the wide area network 300.

As a result, in the hard disk recorder 100, the scene table SCNT for "pasta with eggplant and ground meat" shown in FIG. 7 is selected and the "pasta with eggplant and ground meat" scene is played back from an address in the hard disk drive 121 which is specified by the link pointer in the scene table SCNT. A playback signal is transmitted from the interface circuit 123 to the mobile phone 400 over the wide area network 300. On the screen 42S of the mobile phone 400, therefore, for example, as shown in FIG. 5E, the program showing "pasta with eggplant and ground meat" is played back via streaming and displayed.

According to the system described above, therefore, a scene (an entire program or a desired portion thereof) recorded on the hard disk recorder 100 can be hierarchically selected using the mobile phone 400, and can be played back via streaming.

Next, the case where content is provided to another user will be described.

A description will be given of a case where a program (scene) recorded on the hard disk recorder 100 by a user A is allowed to be copied to an audio-visual (AV) device of another user B or viewed by the user B.

An example structure of a system in this case will now be described.

Figure 2:
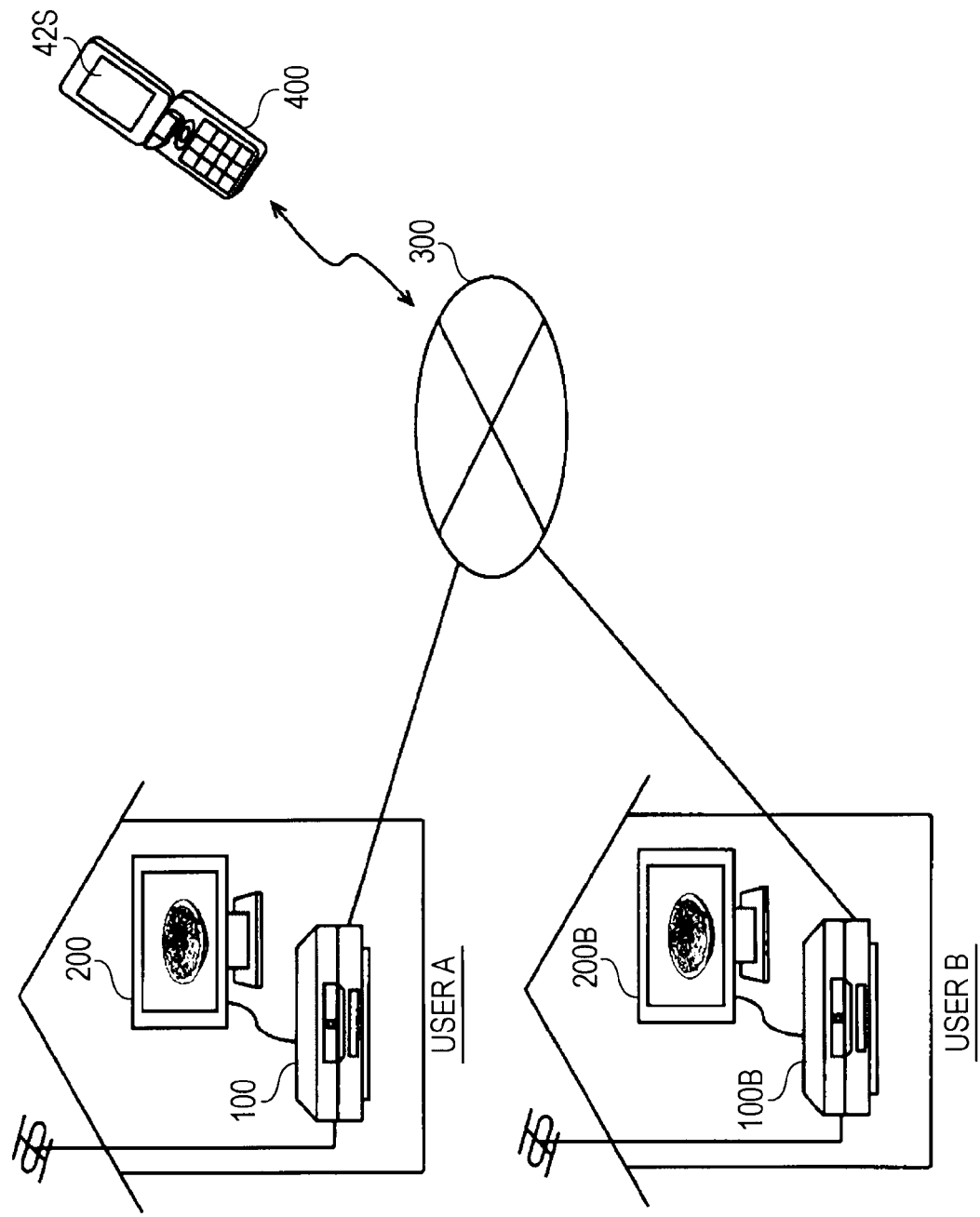
FIG. 2 is a system diagram of an entire system according to an embodiment of the present invention.

For example, as shown in FIG. 2, the hard disk recorder 100 of the user A and a hard disk recorder 100B of the user B are connected to the wide area network 300. The hard disk recorder 100B may have substantially the same structure as the hard disk recorder 100, and a display 200B is connected to the hard disk recorder 100B.

An example of the operation of the system will be described.

As described above, when the user B wishes to obtain a program recorded on the hard disk recorder 100 and played back via streaming using the mobile phone 400, that is, when the user B wishes to copy the program to the hard disk recorder 100B or when the user B wishes to view the program on the display 200B, an address of the hard disk recorder 100B of the user B is entered and copying or viewing is set in the mobile phone 400.

Figure 5F:
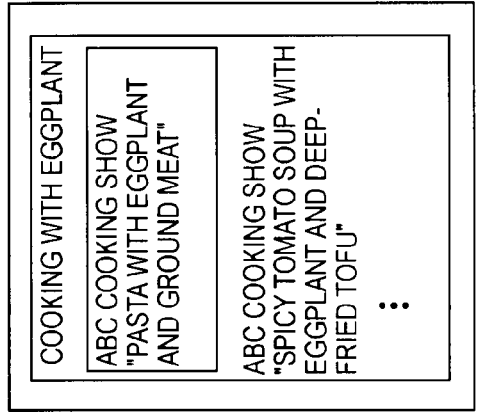

Then, for example, as shown in FIG. 5F, the program name of the corresponding program, a forwarding destination input field 42A, and a forwarding method selection list 42L are displayed on the screen 42S of the mobile phone 400. The forwarding destination input field 42A is used to enter the address of the hard disk recorder 100B of the user B. The forwarding method selection list 42L is used to select whether to copy the data of the program (copying thereof is permitted) or to view the program (only viewing thereof is permitted). In the forwarding method selection list 42L, characters "copy" and "view" are displayed and the cursor 42C is positioned on one of them.

The address of the hard disk recorder 100B of the user B is entered in the forwarding destination input field 42A, and the cursor 42C is moved to "copy" or "view" by operating the cursor key of the mobile phone 400. Thereafter, the set key is operated. Then, for example, a forwarding request list FRLT as shown in FIG. 8 is created in the mobile phone 400, and is transmitted to the hard disk recorder 100 over the wide area network 300.

The forwarding request list FRLT includes an identification code, a forwarding destination address, and a copy flag. The identification code is information for identifying the corresponding program, and is equivalent to the identification code shown in FIG. 7. The forwarding designation address is an address of a forwarding destination entered in the forwarding destination input field 42A on the screen 42S shown in FIG. 5F, namely, in this example, the address of the hard disk recorder 100B. The copy flag is a flag indicating the selection of copying or viewing on the screen 42S shown in FIG. 5F. When copying is selected (copying is permitted), the copy flag is set to "1" while when viewing is selected (only viewing is permitted), the copy flag is set to "0". Then, the following process is executed between the hard disk recorder 100 and the hard disk recorder 100B in accordance with the value of the copy flag.

When copying is selected, the hard disk recorder 100 is connected to the hard disk recorder 100B over the wide area network 300 in accordance with the forwarding destination address in the forwarding request list FRLT transmitted from the mobile phone 400 to the hard disk recorder 100. In the hard disk recorder 100, furthermore, in accordance with the identification code in the forwarding request list FRLT transmitted from the mobile phone 400, the data of the program played back via streaming using the mobile phone 400 and the data of the corresponding scene table SCNT are selected and extracted from the hard disk drive 121, and are transmitted to the hard disk recorder 100B over the wide area network 300.

Then, in the hard disk recorder 100B, the data being transmitted is saved in the hard disk drive 121. This allows the user B to readily view the program, which has been played back via streaming using the mobile phone 400, on the hard disk recorder 100B and the display 200B in his or her home any number of times at any time.

Using the hard disk recorder 100B, the user B can readily select and play back the program transmitted using the transmitted scene table SCNT in a similar manner to that in which the user A can readily select and play back the corresponding program on the hard disk recorder 100 using the scene table SCNT.

When viewing is selected, the hard disk recorder 100 is connected to the hard disk recorder 100B over the wide area network 300 in accordance with the forwarding destination address in the forwarding request list FRLT transmitted from the mobile phone 400 to the hard disk recorder 100. In the hard disk recorder 100, furthermore, a scene table SCNT having the identification code contained in the forwarding request list FRLT transmitted from the mobile phone 400 is extracted from the hard disk drive 121, and the address of the hard disk recorder 100, which is the source, is added to the extracted scene table SCNT. The resulting scene table SCNT is transmitted to the hard disk recorder 100B over the wide area network 300.

In this case, in the hard disk drive 121 of the hard disk recorder 100, if the data of the program played back via streaming using the mobile phone 400 (the data of the program corresponding to the transmitted scene table SCNT) contains is permitted to be deleted, the deletion permission is changed to deletion prohibition.

Then, in the hard disk recorder 100B, the scene table SCNT being transmitted (which has the address of the hard disk recorder 100) is saved in the hard disk drive 121. This allows the user B to connect the hard disk recorder 100B to the hard disk recorder 100 over the wide area network 300 at any time in accordance with the address of the hard disk recorder 100 transmitted from the hard disk recorder 100.

After the connection, the program played back via streaming using the mobile phone 400 can be played back via streaming in accordance with the transmitted scene table SCNT using the hard disk recorder 100B and the display 200B at home at any time.

In this case, in the hard disk recorder 100, when the hard disk recorder 100B completes the streaming playback of the program played back via streaming using the mobile phone 400, the deletion prohibition, which has been set after the scene table SCNT was transmitted from the hard disk recorder 100 to the hard disk recorder 100B, is changed to the original state before the transmission of the scene table SCNT. Thus, the program can be deleted if it is not necessary after the hard disk recorder 100B has completed the streaming playback of the program played back via streaming using the mobile phone 400.

In the hard disk recorder 100B, furthermore, the transmitted scene table SCNT is deleted after the streaming playback has been completed, thus preventing the program from being played back via streaming multiple numbers of times.

Therefore, the hard disk recorder 100 also serves as a video server which allows a program played back via streaming using the mobile phone 400 to be copied to the hard disk recorder 100B to provide easy viewing of the program on the display 200B or provide viewing of the program displayed on the display 200B via streaming playback.

According to the system described above, therefore, a scene recorded on the hard disk recorder 100 can be selected and played back via streaming using the mobile phone 400. This allows t user to record a desired program using the hard disk recorder 100 and to view it at any time at any location using the mobile phone 400.

When another user, or the user B, wishes to obtain the program viewed using the mobile phone 400, the user A merely performs a simple operation on the mobile phone 400 to allow the user B to copy the program to the hard disk recorder 100B of the user B or to play back it via streaming. This only involves a simple operation without performing an operation which is time-consuming for the user A, such as duplicating the corresponding program to a certain medium and mailing the medium to the user B.

Furthermore, it is not necessary for the user A to copy a scene recorded on the hard disk recorder 100 to the mobile phone 400. The user A only selects a desired scene from among a plurality of scenes recorded on the hard disk recorder 100. That is, the user A merely performs substantially the same operation as that when he or she plays back the desired scene using the display 200 at home. The operation is very simple.

Furthermore, a desired scene is hierarchically selected and can be easily selected. Although the CPU 431 used in the mobile phone 400 has generally a lower performance than the CPU 131 used in the hard disk recorder 100, data in each hierarchal layer is managed or processed in the hard disk recorder 100, resulting in a reduction in a load imposed on the CPU 431.

Other Embodiments

Instead of a table format as shown in FIG. 7, each scene table SCNT may be formed in an extensible markup language (XML) format with individual items represented by tags. A keyword or keywords in each scene table SCNT may be created or added after the program name, subtitle, and the like have been analyzed in the hard disk recorder 100.

In a further embodiment, one entire program may be recorded, and thereafter a portion of the program may be left as a scene in accordance with conditions set by a subscriber in the manner shown in, for example, FIG. 6B. In a further embodiment, scheduled recording of a program on the hard disk recorder 100 may be set using the mobile phone 400. In the foregoing description, a program broadcast by a television station is employed. An embodiment of the present invention can also be applied to content delivered at a predetermined time from a provider or any other suitable party.

In a further embodiment, each scene table SCNT may be provided with a copy counter, and the maximum number of times copying is allowed may be set in the copy counter in advance. The value of the copy counter may be decremented by "1" every time the program is copied, and when the value of the copy counter reaches "0", as with the copy flag set to "0", a user may be allowed to only view the program.

In the foregoing description, a television program is recorded on and played back from the hard disk recorder 100, by way of example. Alternatively, content provided from an external object such as a company may be recorded on and played back from the hard disk recorder 100, in which case a billing system can be combined.

It should be understood by those skilled in the art that various modifications, combinations, sub-combinations and alterations may occur depending on design requirements and other factors insofar as they are within the scope of the appended claims or the equivalents thereof.

What is claimed is:

1. A method for providing content, comprising:

in response to a request from a playback apparatus over a network to play back content, transmitting data indicating at least one content available for play back by a first recording and playback apparatus, from the first recording and playback apparatus to the playback apparatus over the network, the at least one content available for play back by the first recording and playback apparatus being stored in the first recording and playback apparatus;

when the playback apparatus receives a selection of one of the at least one content available for play back by the first recording and playback apparatus, requesting the first recording and playback apparatus to stream data of the selected content to the playback apparatus over the network;

when the data of the selected content is streamed to the playback apparatus from the first recording and playback apparatus over the network in response to the request, playing back the selected content being streamed;

when the playback apparatus transmits data indicating the selected content and an address of a second recording and playback apparatus to the first recording and playback apparatus over the network, transmitting at least one of the data of the selected content and data indicating at least one content available for play back by the second recording and playback apparatus, from the first recording and playback apparatus to the second recording and playback apparatus over the network in accordance with the address;

when the playback apparatus transmits the data indicating the selected content and the address of the second recording and playback apparatus, further transmitting data indicating whether or not the selected content is allowed to be copied;

when the data indicating whether or not the selected content is allowed to be copied indicates a copying is permitted, transmitting the data of the selected content and the data indicating the at least one content available for play back by the second recording and playback apparatus, from the first recording and playback apparatus to the second recording and playback apparatus over the network;

when the data indicating whether or not the selected content is allowed to be copied indicates the copying is prohibited, transmitting the data indicating the at least one content available for play back by the second recording and playback apparatus and an address of the first recording and playback apparatus from the first recording and playback apparatus to the second recording and playback apparatus over the network; and when the second recording and playback apparatus transmits a selected one of the at least one content available for play back by the second recording and playback apparatus, to the first recording and playback apparatus over the network, streaming the data of the selected content from the first recording and playback apparatus to the second recording and playback apparatus over the network.

2. The method according to claim 1, further comprising:
when the data indicating whether or not the selected content is allowed to be copied indicates the copying is prohibited, prohibiting, at the first recording and playback apparatus, a deletion of the data of the selected content until the data of the selected content has been streamed to the second recording and playback apparatus over the network.

3. The method according to claim 2, further comprising:
when the data indicating whether or not the selected content is allowed to be copied indicates the copying is prohibited, deleting from the second recording and playback apparatus the data indicating the at least one content available for play back by the second recording and playback apparatus, upon a completion of a streaming playback of the data of the selected content.

4. A recording and playback apparatus, comprising:
an interface circuit configured to communicate over a network;
a processor configured to
receive, over the network, a request to play back content from a playback apparatus;
transmit, in response to receiving the request to play back content from the playback apparatus, data indicating at least one content available for play back by the recording and playback apparatus to the playback apparatus over the network, the at least one content available for play back by the recording and playback apparatus being stored in the recording and playback apparatus;
receive a request to stream data of a selected one of the at least one content available for play back by the recording and playback apparatus, from the playback apparatus over the network;
stream the data of the selected content to the playback apparatus over the network in response to the request to stream data;
transmit, when data indicating the selected content and an address of another recording and playback apparatus is received from the playback apparatus, at least one of the data of the selected content and data indicating at least one content available for play back by the other recording and playback apparatus, to the other recording and playback apparatus over the network in accordance with the address;
receive the data indicating the selected content, the address of the other recording and playback apparatus, and data indicating whether or not the selected content is allowed to be copied;
when the data indicating whether or not the selected content is allowed to be copied indicates a copying is permitted, transmit the data of the selected content and the data indicating the at least one content available for play back by the other recording and playback apparatus, to the other recording and playback apparatus over the network;
when the data indicating whether or not the selected content is allowed to be copied indicates the copying is prohibited, transmit the data indicating the at least one content available for play back by the other recording and playback apparatus and an address of the recording and playback apparatus to the other recording and playback apparatus over the network; and
when the other recording and playback apparatus transmits a selected one of the at least one content available for play back by the other recording and playback apparatus, to the recording and playback apparatus over the network, stream the data of the selected content to the other recording and playback apparatus over the network.

5. The recording and playback apparatus according to claim 4, wherein the processor is further configured to prohibit, when the data indicating whether or not the selected content is allowed to be copied indicates the copying is prohibited, a deletion of the data of the selected content from the recording and playback apparatus until the data of the selected content has been streamed to the other recording and playback apparatus over the network.

6. The recording and playback apparatus according to claim 4 or 5, wherein the processor is further configured to delete from the other recording and playback apparatus, when the data indicating whether or not the selected content is allowed to be copied indicates the copying is prohibited, the data indicating the at least one content available for play back by the other recording and playback apparatus, upon a completion of a streaming of the data of the selected content to the other recording and playback apparatus.

7. The recording and playback apparatus according to claim 4, further comprising:
a memory configured to store the at least one content available for play back by the recording and playback apparatus.

8. A playback apparatus, comprising:
a communication unit configured to communicate over a network;
a processor configured to
transmit a request to play back content to a first recording and playback apparatus device over the network;
receive data indicating at least one content available for play back by the first recording and playback apparatus from the first recording and playback apparatus, the at least one content available for play back by the first recording and playback apparatus being stored in the first recording and playback apparatus;

request the first recording and playback apparatus to stream data of a selected one of the at least one content available for play back by the first recording and playback apparatus;

receive the data of the selected content from the first recording and playback apparatus over the network, the data of the selected content being streamed from the first recording and playback apparatus;

play back the selected content data being streamed from the first recording and playback apparatus;

transmit, to the first recording and playback apparatus, a request to transmit at least one of the selected content data and data indicating at least one content available for play back by a second recording and playback apparatus to the second recording and playback apparatus over the network in accordance with an address associated with the second recording and playback apparatus, the request to transmit including data indicating the selected content data and the address; and transmit the data indicating the selected content, the address associated with the second recording and playback apparatus, and data indicating whether or not the selected content is allowed to be copied, wherein when the data indicating whether or not the selected content is allowed to be copied indicates a copying is permitted, the first recording and playback apparatus transmits the data of the selected content and the data indicating the at least one content available for play back by the second recording and playback apparatus, to the second recording and playback apparatus over the network, when the data indicating whether or not the selected content is allowed to be copied indicates the copying is prohibited, the first recording and playback apparatus transmits the data indicating the at least one content available for play back by the second recording and playback apparatus and an address of the first recording and playback apparatus to the second recording and playback apparatus over the network, and when the second recording and playback apparatus transmits a selected one of the at least one content available for play back by the second recording and playback apparatus, to the first recording and playback apparatus over the network, the first recording and playback apparatus streams the data of the selected content to the second recording and playback apparatus over the network.

9. The playback apparatus according to claim 8, wherein the processor is further configured to transmit, to the first recording and playback apparatus, the request to transmit to the second recording and playback apparatus with data indicating whether or not the selected content is allowed to be copied.

* * * * *